(12) United States Patent
Morimoto et al.

(10) Patent No.: US 7,237,906 B2
(45) Date of Patent: Jul. 3, 2007

(54) PROJECTION-TYPE IMAGE DISPLAY APPARATUS

(75) Inventors: Teruyuki Morimoto, Tokyo (JP); Kazuhiro Yamada, Tokyo (JP); Hideo Kanai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 246 days.

(21) Appl. No.: 11/138,324

(22) Filed: May 27, 2005

(65) Prior Publication Data

US 2005/0264766 A1    Dec. 1, 2005

(30) Foreign Application Priority Data

May 31, 2004    (JP)    .............. 2004-162485

(51) Int. Cl.
G03B 21/16    (2006.01)
G03B 21/18    (2006.01)
G03B 21/26    (2006.01)

(52) U.S. Cl. .............................. 353/61; 353/57; 353/52
(58) Field of Classification Search .................. 353/61, 353/119, 52, 57, 31, 30
See application file for complete search history.

(56) References Cited

U.S. PATENT DOCUMENTS 6,350,033 B1    2/2002  Fujimori
6,402,324 B1    6/2002  Kuroda et al.
6,523,960 B2    2/2003  Watanabe
6,644,817 B2   11/2003  Kuroda et al.
6,682,197 B2    1/2004  Shiraishi et al.
2004/0100621 A1*  5/2004  Shiraishi et al. .............. 353/57

FOREIGN PATENT DOCUMENTS

JP    2836619    10/1998
JP    3314774     6/2002

* cited by examiner

*Primary Examiner*—Melissa Jan Koval
*Assistant Examiner*—Andrew Kong
(74) *Attorney, Agent, or Firm*—Pillsbury Winthrop Shaw Pittman, LLP

(57) ABSTRACT

A projection-type image display apparatus includes a body including an air inlet and an air outlet and accommodating a heating element; a lamp unit including a light-source lamp and a housing that accommodates the light-source lamp and that includes an air intake and an exhaust opening communicating with the air outlet; a duct unit including a first end adjacent to the air inlet, a second end adjacent to the air intake, and a flow channel connecting the first and second ends; a radiating unit thermally connected to the heating element, at least part of the radiating unit being disposed inside the flow channel of the duct unit; and a fan, drawing air from the air inlet through the first end of the duct unit and sending the air to the air intake through the second end, disposed between the radiating unit and the second end.

17 Claims, 10 Drawing Sheets

PROJECTION-TYPE IMAGE DISPLAY APPARATUS

CROSS-REFERENCE TO RELATED APPLICATIONS

This application claims the benefit of priority of Japanese Patent Application No. 2004-162485, filed May 31, 2004, the entire contents of which are incorporated herein by reference.

BACKGROUND

1. Field

The present invention relates to projection-type image display apparatuses projecting enlarged images shown on display devices onto screens, and in particular, relates to projection-type image display apparatuses including structures for cooling the display devices, light-source lamps, or the like.

2. Description of the Related Art

Projection-type image display apparatuses enlarge images shown on display devices such as small cathode-ray tubes (CRTs) or light valves (small display devices capable of storing and removing the images in real time) through projection lenses and project the images onto screens.

Among such display devices, liquid-crystal devices as well as the small CRTs are in widespread use. The projection-type image display apparatuses including the liquid-crystal devices serving as the display devices are often referred to as liquid-crystal projectors.

The display devices can be grouped under a reflective type and a transmissive type. In the projection-type image display apparatuses including the reflective display devices, light beams from light sources are incident on the front surfaces of the display devices, and are reflected from the display devices. The projection-type image display apparatuses enlarge the reflected light beams through optical systems such as lenses, and project the light beams onto screens.

On the contrary, in the projection-type image display apparatuses including the transmissive display devices, light beams from light sources are incident on the rear surfaces of the display devices, and are transmitted through the display devices. The projection-type image display apparatuses enlarge the transmitted light beams through optical systems such as lenses, and project the light beams onto screens.

Both the reflective and transmissive types of liquid-crystal display devices have been already put into practice.

Additionally, display devices referred to as digital micro-mirror devices (DMD) have also been developed, and are employed in the projection-type image display apparatuses. The DMDs include minute mirrors on the front surfaces of the display devices, and the number of mirrors is the same as that of the pixels. The light beams entering the front surfaces of the DMDs are modulated and reflected by electronically and mechanically changing the angles of the individual mirrors. That is to say, the DMDs are of a reflective type.

The projection-type image display apparatuses that apply light beams from the light sources to the front surfaces of the DMDs and that project the modulated light beams reflected from the surfaces of the DMDs onto screens through the optical systems such as the lenses are often referred to as digital light processing (DLP™) projectors. The DLP is a trademark of Texas Instruments Incorporated in the United States of America.

The recent development in high-brightness technology in addition to high-resolution technology of the projection-type image display apparatuses including the liquid-crystal devices or the DMDs has been remarkable. Up to now, in order to use the projection-type image display apparatuses, the brightness in rooms needed to be reduced by, for example, closing curtains. However, due to the high-brightness technology, the projection-type image display apparatuses are available under ordinary indoor brightness substantially without trouble.

The high-brightness technology is achieved by a technology of a reduction in loss of light transmission systems and by an increase in the amount of emission of the light sources themselves.

Due to the increase in the amount of emission of the light sources, the amount of heat generated in the interiors of the projection-type image display apparatuses is increased. Meanwhile, components in the projection-type image display apparatuses must be highly densified due to user demands for compact profiles.

Therefore, the development in technology for efficiently cooling the increasing heat even with the highly densified layout of the components has become essential.

U.S. Pat. Nos. 6,644,817, 6,402,324, and 6,350,033 disclose technologies for cooling projection-type image display apparatuses including transmissive liquid-crystal devices serving as display devices.

The projection-type image display apparatus disclosed in U.S. Pat. Nos. 6,644,817 or 6,402,324 includes two intake fans for drawing outside air disposed at the front left and the front right of the casing of the apparatus, and two exhaust fans for discharging the air disposed at the rear. The apparatus further includes three air intakes, two of which are formed in front of the intake fans and the rest is formed in the bottom center.

The fans and the air intakes form first and second flow channels in which air flows from the front to the rear along the left and right side surfaces of the casing of the projection-type image display apparatus, and also form a third flow channel in which air flows from the bottom center to the rear.

Moreover, in the projection-type image display apparatus, two separate power-supply units are disposed at the left and the right of the casing. These two power-supply units are cooled by the first and second flow channels.

A light-source unit generating the most heat is disposed in the rear of the casing adjacent to the exhaust fans, and cooled by the third flow channel in addition to the first and second flow channels.

Furthermore, a structure for cooling three transmissive liquid-crystal devices corresponding to red, green, and blue (RGB) colors included in the projection-type image display apparatus is disclosed in U.S. Pat. No. 6,350,033. The transmissive liquid-crystal devices generate heat since part of the optical energy of the transmitted light beams is converted into the thermal energy as a transmission loss. Accordingly, an additional intake fan for cooling the transmissive liquid-crystal devices forcedly circulates the air inside a sealed space accommodating the transmissive liquid-crystal devices so as to cool the air.

U.S. Pat. No. 6,682,197 discloses a technology for cooling a projection-type image display apparatus including reflective liquid-crystal devices.

According to an embodiment of the projection-type image display apparatus disclosed in U.S. Pat. No. 6,682,197, the projection-type image display apparatus includes one large exhaust fan and two relatively small intake fans. Furthermore, three separate reflective liquid-crystal devices are disposed at three remote positions.

One of the intake fans is disposed adjacent to one of the three reflective liquid-crystal devices so as to cool this reflective liquid-crystal device substantially exclusively.

The other intake fan and the large exhaust fan cool the other two reflective liquid-crystal devices and a light-source unit generating the most heat.

The light-source unit includes a light-emitting element and a substantially paraboloidal metallic reflector covering the light-emitting element. The cooling air cools the reflector and the light-emitting element whose heat is transferred to the reflector by flowing along the rear surface of the metallic reflector.

The two reflective liquid-crystal devices and the reflector of the light-source unit are not arranged in a line, but a duct structure is formed by appropriately disposing casing members and guiding plates for the cooling air. Thus, the two reflective liquid-crystal devices and the light-source unit are cooled by the intake fan and the exhaust fan disposed at the inlet and the outlet of the duct structure.

Since light-source units generate the most heat in projection-type image display apparatuses, extra high cooling capacity for the units is required for high-brightness projection-type image display apparatuses.

Also, display devices such as DMDs and liquid-crystal devices generate heat when semiconductor elements drive pixels. In addition to the self-heating, reflective display devices generate heat due to a reflection loss, and transmissive display devices generate heat due to a transmission loss.

The heat due to the reflection loss or the transmission loss is increased relative to the amount of emission of the light sources. Accordingly, the cooling of the display devices as well as the cooling of the light-source units is essential as the brightness of the projection-type image display apparatuses is increased.

On the other hand, as the resolution of the recent projection-type image display apparatuses has been improved, there has been an increasing need for viewing not only slides and still images as in conventional art but also movies and music videos. Thus, a technology for reducing noise generated by, for example, fans is also required in addition to the cooling technology.

According to the cooling technologies disclosed in U.S. Pat. Nos. 6,644,817, 6,402,324, and 6,350,033, not only optical components such as the light-source units and the transmissive display devices but also the power-supply units and control circuit boards are arranged suitable for cooling. However, the arrangements are not applicable to projection-type image display apparatuses having different circuit configurations or modes.

Furthermore, since four or five intake and exhaust fans are required for cooling, improvements in terms of the noise must be introduced.

According to the cooling technology disclosed in U.S. Pat. No. 6,682,197, the duct structure is formed of the casing members and the guiding plates for the wind direction. The light-source unit and the reflective liquid-crystal devices disposed inside are efficiently cooled by the cooling air passing through the duct structure.

However, since the projection-type image display apparatus disclosed in U.S. Pat. No. 6,682,197 includes the intake fan and the exhaust fan at the front left and the front right thereof, the duct structure connecting the intake fan and the exhaust fan is not linear, and includes a plurality of bending portions and wind-direction guides at certain positions thereof.

As a result, it is estimated that the pressure loss of this duct structure will be high compared with that of a linear duct structure. Therefore, if the heat generated by the light-source unit and the display devices is increased due to the high brightness, there is a possibility of insufficient cooling capacity caused by insufficient air volume unless the number of the fans or the power of the fans is increased. In addition, noise is increased with the number of the fans or the power of the fans.

SUMMARY OF THE INVENTION

Accordingly, it is an object of the present invention to provide a projection-type image display apparatus that can efficiently cool a light-source unit and a display device.

To achieve the above-described object, the projection-type image display apparatus according to the present invention includes a body including an air inlet and an air outlet and accommodating a heating element; a lamp unit including a light-source lamp and a housing that accommodates the light-source lamp and that includes an air intake and an exhaust opening, the exhaust opening communicating with the air outlet; a duct unit including a first end adjacent to the air inlet, a second end adjacent to the air intake, and a flow channel connecting the first end and the second end; a radiating unit thermally connected to the heating element, at least part of the radiating unit being disposed inside the flow channel of the duct unit; and a fan disposed between the radiating unit in the flow channel and the second end of the duct unit, the fan drawing air from the air inlet through the first end of the duct unit and sending the air to the air intake through the second end of the duct unit.

According to the projection-type image display apparatus of the present invention, the light-source unit and the display device can be efficiently cooled.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

A first embodiment of a projection-type image display apparatus 1 according to the present invention will now be described with reference to the drawings.

(1) Overall Structure of Display Apparatus

In the projection-type image display apparatus 1, light beams from a light source such as an extra-high pressure mercury lamp are incident on a display device referred to as a DMD through a rotational film with RGB colors (color wheel). The light beams modulated in the DMD for each pixel are reflected, enlarged through a projection lens unit 6, and then projected onto a screen.

Figure 1A:
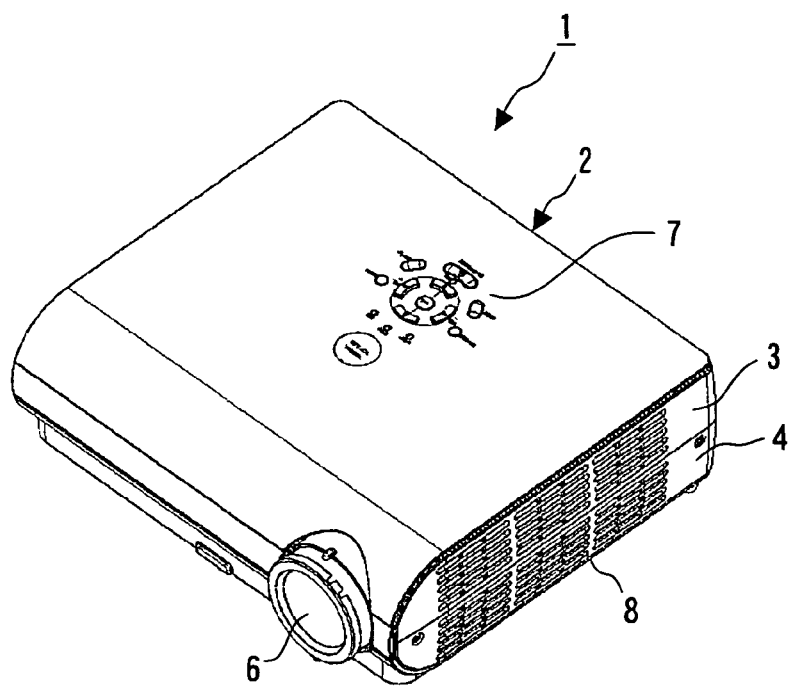
FIGS. 1A and 1B illustrate a projection-type image display apparatus according to an embodiment of the present invention.
Figure 1B:
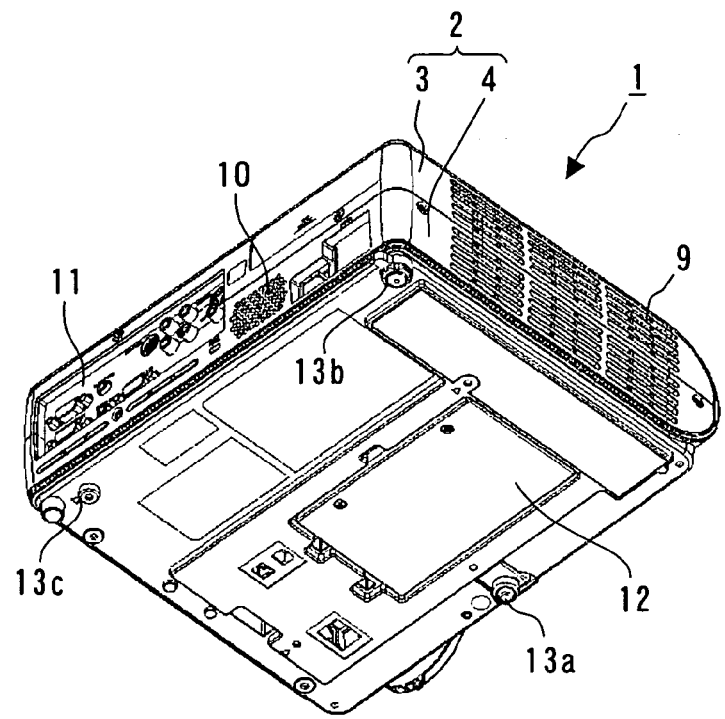

FIGS. 1A and 1B are exemplary overviews of the projection-type image display apparatus 1. FIG. 1A is a perspective view of the projection-type image display apparatus 1 shown from above, and FIG. 1B is a perspective view shown from below.

With reference to FIGS. 1A and 1B, the projection-type image display apparatus 1 includes a body casing 2 separable into two portions (upper and lower). Part of the projection lens unit 6 is exposed to the front of the body casing 2. Components of the projection-type image display apparatus 1 are accommodated in the body casing 2.

The body casing 2 includes an upper casing 3 and a lower casing 4.

A large number of air inlets 8 for drawing cooling air are provided at the left side surfaces of the upper casing 3 and the lower casing 4 when viewed from the back.

A plurality of operational buttons 7 used for various operations of the projection-type image display apparatus 1 are provided on the top surface of the upper casing 3.

As shown in FIG. 1B, a large number of air outlets 9 for discharging the cooling air are provided at the right side surface of the upper casing 3 and the lower casing 4 when viewed from the back.

A large number of communicating holes 10 are formed in a lower portion of the rear surfaces of the body casing 2. These communicating holes 10 output sound of a speaker disposed inside the body casing 2.

A connector panel 11 having various connectors to be linked with external devices such as television receivers and computers is provided at the rear surface of the body casing 2.

A cover 12 for replacing a light-source lamp is provided at the bottom surface of the lower casing 4. Feet 13a, 13b, and 13c for supporting the projection-type image display apparatus 1 with three points are disposed also at the bottom surface of the lower casing 4.

(2) Layout of Display Components

Figure 2:
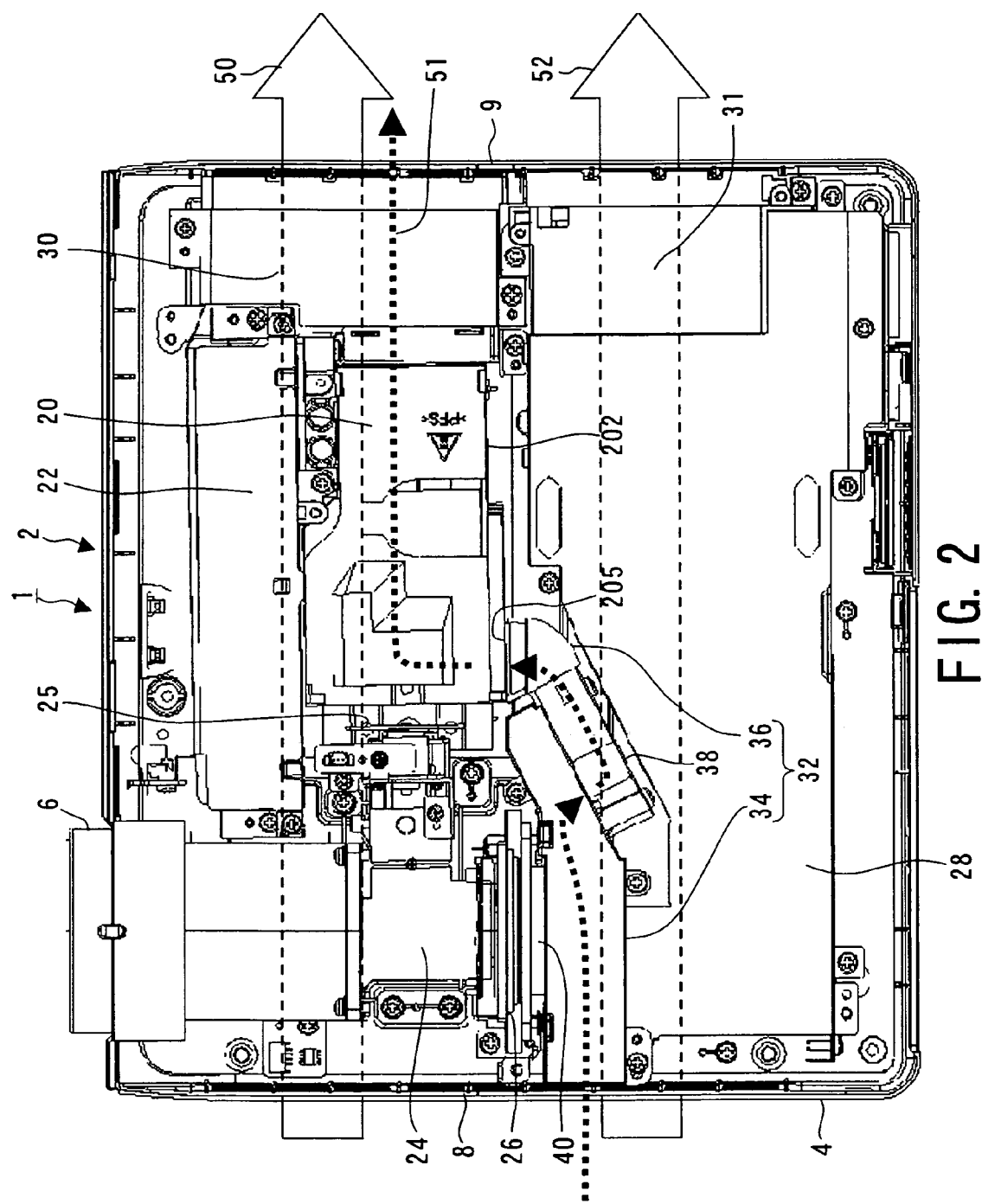
FIG. 2 illustrates the layout of components of the projection-type image display apparatus according to an embodiment of the present invention.

FIG. 2 is a top view of the projection-type image display apparatus 1 illustrating the layout of components of the projection-type image display apparatus 1 when the upper casing 3 of the body casing 2 is removed.

In FIG. 2, the projection lens unit 6 is disposed adjacent to the front left of the body casing 2. Light beams are emitted from the projection lens unit 6, and enlarged images are projected onto a screen (not shown) disposed in front of the projection lens unit 6.

A lamp unit 20 including a light-source lamp 201 (see FIG. 10) is disposed adjacent to the center of the body casing 2. In FIG. 2, an optical unit 24 is disposed at the left of the lamp unit 20 so as to be in contact with the rear portion of the projection lens unit 6. The optical unit 24 optically changes the direction of the light beams sent from the lamp unit 20.

A color wheel 25 is disposed between the lamp unit 20 and the optical unit 24. The color wheel 25 is a rotational disk having a transparent film of three primary colors (RGB). The color wheel 25 colorizes the white light from the light source.

Moreover, a reflective display device 26 is disposed between the optical unit 24 and a radiating unit 40 so as to be in contact with the optical unit 24. The reflective display device 26 is composed of, for example, an electronic device such as a DMD. The DMD includes minute mirrors on a surface of the display device, and the number of mirrors is the same as that of the pixels. The light beams entering the surface of the DMD are modulated and reflected so as to produce images by electronically and mechanically changing the angles of the individual mirrors at high speed.

A power supply 22 supplying power to the light-source lamp 201 is disposed between the lamp unit 20 and the front surface of the body casing 2.

Moreover, an exhaust fan 30 for discharging cooling air to the exterior of the body casing 2 is disposed between the lamp unit 20 and the air outlets 9.

A main circuit block 28 is disposed in a rear half space occupying substantially half the body casing 2.

The main circuit block 28 includes a printed circuit board disposed parallel to the bottom surface of the body casing 2, electronic components mounted on the printed circuit board, a power-supply circuit (not shown) for supplying power to, for example, an exhaust fan and an intake fan, and the like.

Moreover, an exhaust fan 31 for the main circuit block is disposed between the main circuit block 28 and the right side surface of the body casing 2.

A duct unit 32 extends from the central portion to the left side surface of the body casing 2. One end of the duct unit 32 is disposed adjacent to the air inlets 8 provided at the left side surface of the body casing 2 so as to face the air inlets 8. The other end of the duct unit 32 is linked with the lamp unit 20.

The duct unit 32 includes an intake duct 34 and an exhaust duct 36 having a sector shape in FIG. 2. An intake fan 38 is disposed between the intake duct 34 and the exhaust duct 36, and hermetically linked with both the ducts.

The intake duct 34 accommodates radiating fins (not shown) of the radiating unit 40. A base 402 of the radiating unit 40 is thermally connected to a radiating surface opposite to a reflecting surface of the reflective display device 26.

Next, functions of an optical system in the projection-type image display apparatus 1 will now be schematically described.

The beams of white light produced by the light-source lamp embedded in the lamp unit 20 are emitted from the left side surface of the lamp unit 20 in FIG. 2. The beams of the white light pass through the color wheel 25, and the resultant light beams of three primary colors (RGB) are incident on the optical unit 24.

The direction of the light beams incident on the optical unit 24 is changed in the optical unit 24, and the light beams are directed toward the reflective display device 26. The reflecting surface of the reflective display device 26 faces forward, i.e., the projection lens unit 6. Thus, the light beams reflected from the reflecting surface travel in straight lines through the optical unit 24, and are incident on the projection lens unit 6.

Beam width of the light beams is expanded by a group of lenses including focusing mechanisms and the like in the projection lens unit 6, and the enlarged images are projected onto a screen mounted on the outside. In this manner, the images shown on the reflective display device 26 are enlarged and projected onto the screen.

(3) Flow of Cooling Air in Entire Display

Next, fundamental flow channels of cooling air flowing in the body casing 2 of the projection-type image display apparatus 1 will now be described.

A substantially linear first flow channel 50 is provided adjacent to the front of the body casing 2, and extends from the air inlets 8 at the left side surface to the air outlets 9 at the right side surface.

In the first flow channel 50, outside air is drawn from the air inlets 8 to the body casing 2 by the pressure (negative pressure) generated by the exhaust fan 30, and flows from the left side in FIG. 2 along surfaces of components such as the projection lens unit 6, the optical unit 24, and the power supply 22 for the light source or through the internal spaces. The components are cooled by the flow of the cooling air, and then the cooling air is forcedly discharged from the air outlets 9 to the exterior by the exhaust fan 30. Also, part of the air flowing in the first flow channel 50 flows along the lamp unit 20, and part of heat generated at the light-source lamp 201 (see FIG. 10) embedded in the lamp unit 20 is exchanged with the air.

In a second flow channel 51, air drawn from the air inlets 8 flows into the lamp unit 20 through the intake duct 34, the intake fan 38, and the exhaust duct 36, and then flows from the air outlets 9 to the exterior through the exhaust fan 30.

In the second flow channel 51, the reflective display device 26 thermally connected to radiating fins 401 accommodated in the intake duct 34 is cooled by the heat exchange with the radiating fins 401. Also, in the second flow channel 51, the cooling air pressurized by the intake fan 38 flows in the interior of the lamp unit 20 so as to cool the light-source lamp 201.

As described above, the second flow channel 51 is designed specifically for cooling the reflective display device 26 and the light-source lamp 201.

A substantially linear third flow channel 52 is provided adjacent to the rear of the body casing 2, and extends from the air inlets 8 at the left side surface to the air outlets 9 at the right side surface.

In the third flow channel 52, outside air is drawn from the air inlets 8 by the pressure (negative pressure) mainly generated by the exhaust fan 31 for the main circuit block, and the cooling air flows along surfaces of the printed circuit board of the main circuit block 28, the electronic components mounted on the printed circuit board, and the power-supply circuit. These components are cooled by the flow of the cooling air, and then the cooling air is discharged from the air outlets 9 to the exterior.

In the projection-type image display apparatus 1, cooling of the light-source lamp 201, which is an optical source, and the reflective display device 26 is especially important.

The light-source lamp 201 generates the most heat of all the components in the projection-type image display apparatus 1, and therefore, the lifetime of the light-source lamp 201 may be shortened if the cooling is insufficient.

Moreover, the optical energy of the light beams from the light-source lamp 201 incident on the reflective display device 26 is not entirely reflected, and is partially converted to thermal energy as reflection loss. The temperature of the reflective display device 26 becomes high due to this thermal energy and self-heating of semiconductor elements embedded therein.

The reflective display device 26 is basically a semiconductor device. Therefore, if the device is not kept at less than or equal to a predetermined temperature, the lifetime of the device may be reduced, or the device may be damaged in some cases.

The reflective display device 26 is a key device in the projection-type image display apparatus 1, and the cooling of the reflective display device 26 is extremely important as well as that of the light-source lamp 201.

The second flow channel 51 is designed specifically for forcedly cooling the reflective display device 26 and the light-source lamp 201.

Accordingly, the structure and the cooling effect of the second flow channel 51 will now be described in detail.

(4) Structure of the Second Flow Channel 51

Figure 3:
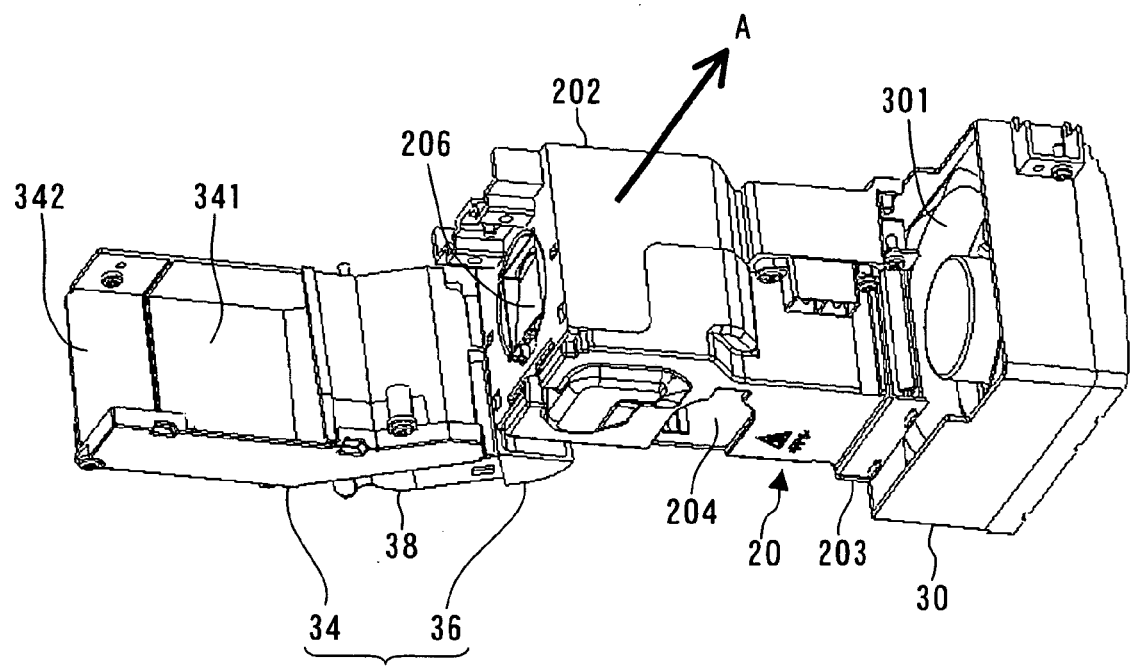
FIG. 3 illustrates the structures associated with a cooling channel (a second flow channel) for cooling a display device and a light-source lamp included in the projection-type image display apparatus according to an embodiment of the present invention.

FIG. 3 is a perspective view illustrating the structures associated with the second flow channel 51. The direction indicated by an arrow A in FIG. 3 corresponds to the direction toward the front of the projection-type image display apparatus 1.

In FIG. 3, an intake opening 342 at the left end is disposed so as to face the air inlets 8 at the left side surface of the body casing 2. In addition, the exhaust fan 30 at the right end is disposed so as to face the air outlets 9 at the right side surface of the body casing 2.

As shown in FIG. 3, the duct unit 32 includes the intake duct 34 and the exhaust duct 36, and the intake fan 38 is disposed therebetween.

The intake duct 34 includes an opening 341 for heat radiation in addition to the intake opening 342 at one end of the duct unit 32. The radiating unit 40 (described below) is fitted to the opening 341 so as to hermetically seal the opening 341. Therefore, the air drawn from the intake opening 342 flows in the intake duct 34 without leaking.

The exhaust duct 36 is connected to an air intake 205 (see FIG. 8) formed in a housing 202 of the lamp unit 20.

In FIG. 3, an optical opening 206 is provided at the left side surface of the housing 202 such that the light beams of the light-source lamp 201 are emitted from this optical opening 206. A glass plate is fitted to the optical opening 206 such that the cooling air flowing into the housing 202 does not leak from the optical opening 206.

In FIG. 3, a bell-shaped opening 204 for a temperature sensor is provided at the lower surface (upper surface when installed) of the housing 202. The temperature sensor (not shown) detects the inner temperature of the housing 202. In the installed state, the temperature sensor is fitted to the opening 204 so as to hermetically seal the housing 202.

A metallic lattice 203 integrated with the housing 202 is disposed between the housing 202 and the exhaust fan 30, and functions as a cooling mechanism for reducing the temperature of the exhaust air. The air passing through the interior of the housing 202 is cooled by the cooling fins provided in the metallic lattice 203, and then flows toward the exhaust fan 30.

The exhaust fan 30 is disposed adjacent to the metallic lattice 203, and discharges the air from the housing 202 to the exterior.

As shown in FIG. 3, an opening 301 of the exhaust fan 31 faces the interior of the body casing 2 except for part corresponding to the metallic lattice 203. With this structure, the exhaust fan 30 discharges the air through the first flow channel shown in FIG. 2 to the exterior in addition to the air through the second flow channel 51.

(5) Structure of Duct Unit

Figure 4:
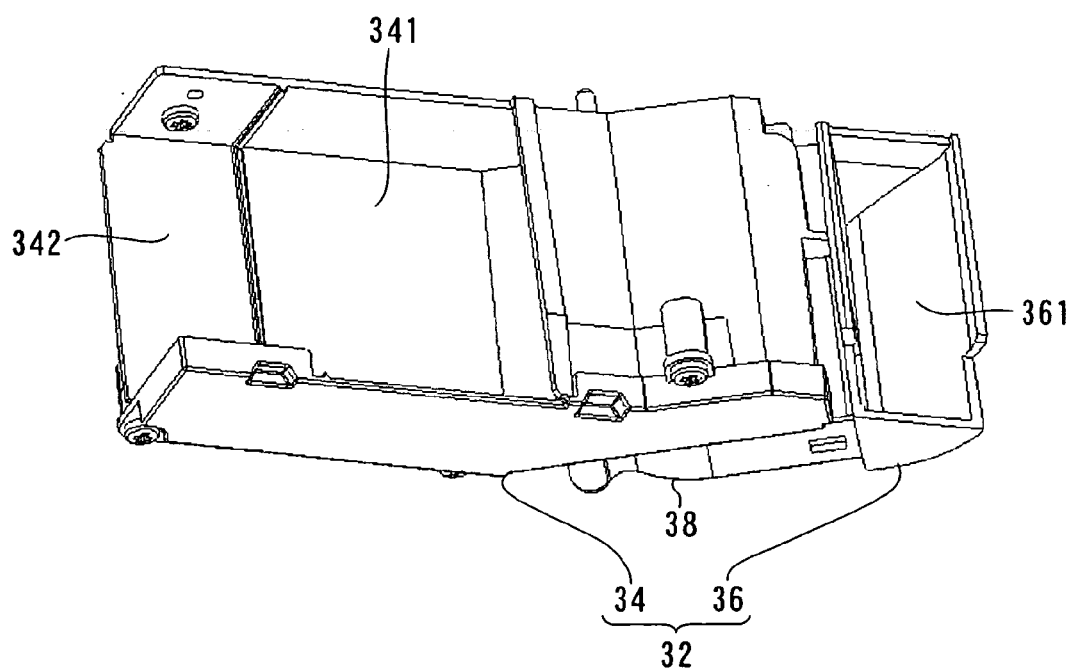
FIG. 4 illustrates the structure of a duct unit included in the projection-type image display apparatus according to an embodiment of the present invention.

FIG. 4 illustrates two components, the duct unit 32 and the intake fan 38 that are parts of the second flow channel 51.

As shown in FIG. 4, the exhaust duct 36 connected to the intake fan 38 includes an exhaust opening 361 at the other end of the duct unit 32. This exhaust opening 361 is connected to the air intake 205.

The flowing direction of the air discharged from the intake fan 38 is changed, for example, approximately 75° by the exhaust duct 36, and the air flows into the housing 202. In this manner, the exhaust duct 36 functions as a bend, and the arc-shaped face of the exhaust duct 36 leads to a reduction in the channel resistance.

Figure 5:
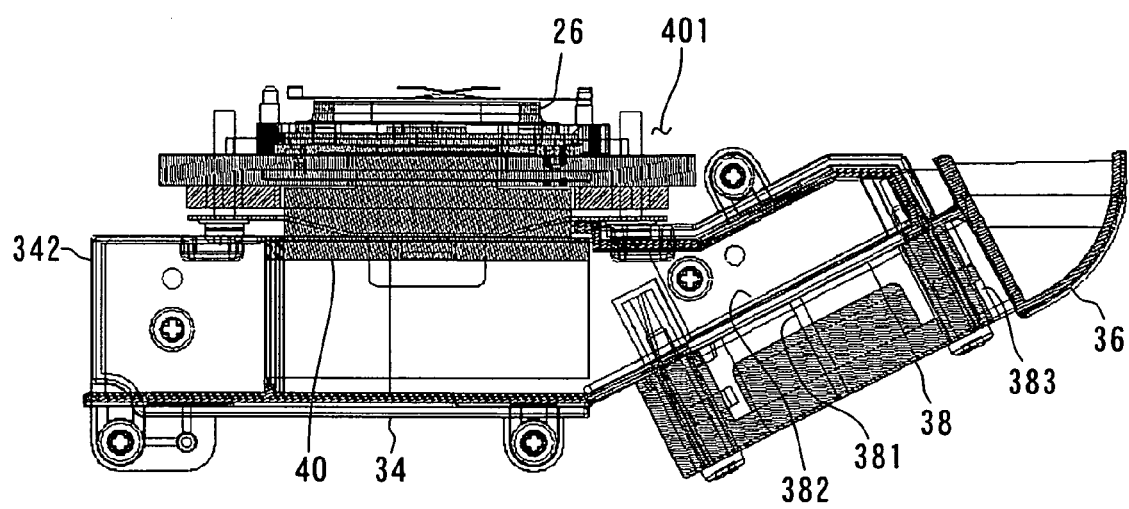
FIG. 5 is a cross-sectional view of the duct unit included in the projection-type image display apparatus according to an embodiment of the present invention.

FIG. 5 is a cross-sectional view illustrating the arrangement of components of the intake duct 34, the intake fan 38, and the exhaust duct 36 when viewed from the top of the projection-type image display apparatus 1.

In FIG. 5, the radiating unit 40, the reflective display device 26 thermally connected to the radiating unit 40, an attachment member thereof, and the like fixed to the intake duct 34 are also shown.

The motor-driven intake fan 38 disposed between the intake duct 34 and the exhaust duct 36 rotates on a rotating shaft 381 of the fan. The intake duct 34 has an opening at a position corresponding to an inlet 382 of the fan such that air is drawn from the opening. Moreover, the exhaust duct 36 has an opening at a position corresponding to an outlet 383 of the fan such that the air is discharged from the opening.

The intake fan 38 is of a multiblade centrifugal type (sometimes referred to as a sirocco fan). That is to say, the multiblade fan having a large number of blades in the radial direction draws air from the direction parallel to the rotating shaft 381, and discharges the air to the direction orthogonal to the rotating shaft 381 by centrifugal force.

In general, static pressure of multiblade centrifugal fans is higher than that of axial fans, and thus the multiblade centrifugal fans are suitable especially for flow channels with high pressure losses.

Figure 6:
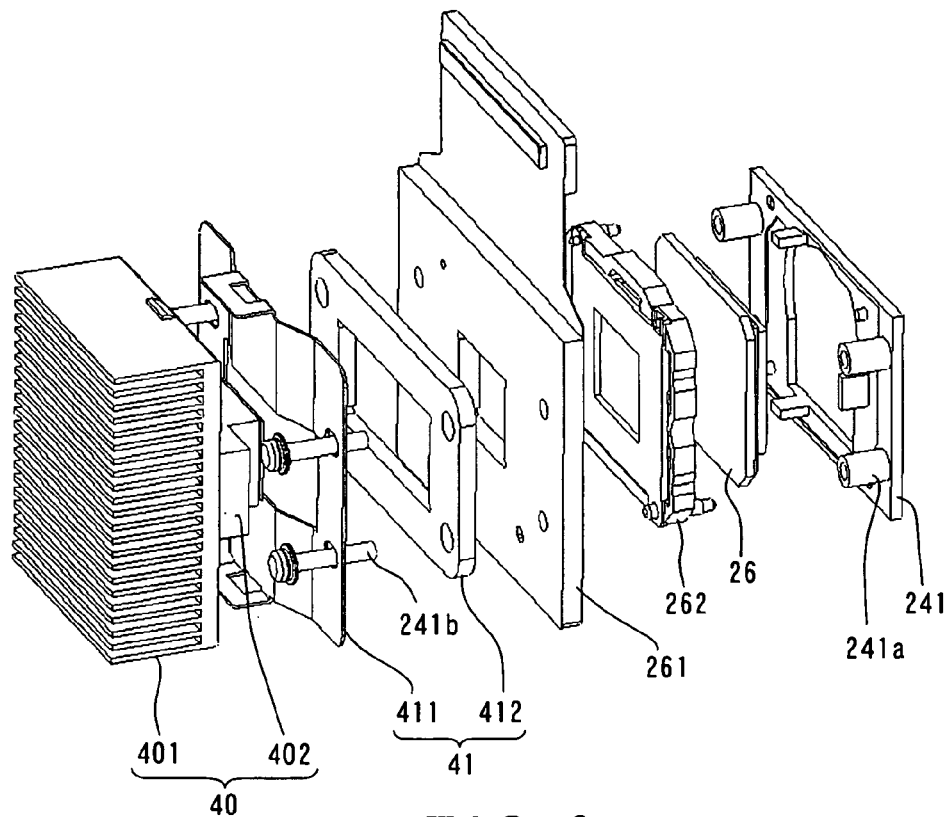
FIG. 6 is a perspective view illustrating the detailed structures of a reflective display device and a radiating unit for radiating the heat of the device when viewed from the front.

FIG. 6 illustrates the detailed structures of components including the radiating unit 40 attached to the intake duct 34 of the projection-type image display apparatus 1.

The radiating unit 40 includes a large number of tabular radiating fins 401 integrated with the base 402. These are composed of metal such as aluminum with high thermal conductivity. The radiating fins 401 are accommodated inside the intake duct 34.

Meanwhile, the reflective display device 26, which is a heating element, is electrically connected to a printed circuit board 261, and the rear surface (radiating surface) of the reflective display device 26 is thermally connected to the base 402 of the radiating unit 40.

The radiating unit 40 and the reflective display device 26 are mechanically integrated together by fastening clamp screws 241b into bosses 241a formed on a fixing member 241 through an attachment member 41 including an attachment plate 411 and a reinforcing plate 412, the printed circuit board 261, and a DMD casing 262.

The clamp screws 241b are fixed to screw holes in the bosses 241a of the fixing member 241 through guiding holes of the reinforcing plate 412 and the printed circuit board 261.

The fixing member 241 is integrated with the optical unit 24 shown in FIG. 2.

Figure 7:
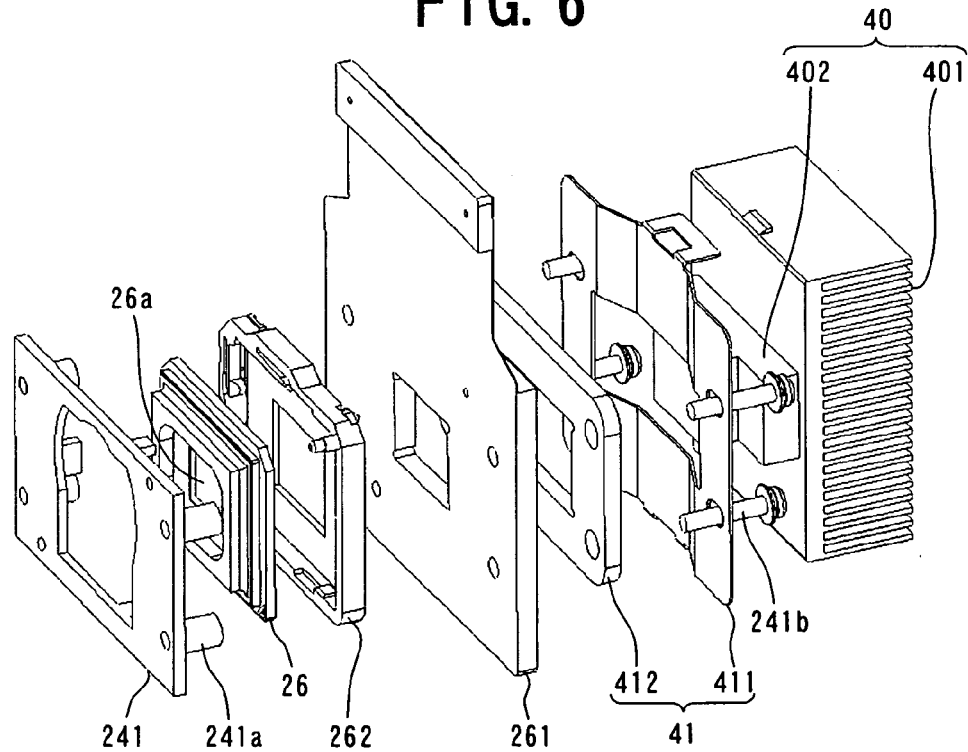
FIG. 7 is a perspective view illustrating the detailed structures of the reflective display device and the radiating unit for radiating the heat of the device when viewed from the back.

FIG. 7 illustrates the components disposed adjacent to the intake duct 34 of the projection-type image display apparatus 1 shown in FIG. 6 from a different angle. With reference to FIG. 7, the reflective display device 26 thermally connected to the radiating unit 40 has a hollow portion in the center adjacent to the fixing member 241, and a reflecting surface 26a is formed on this hollow portion. The DMD includes a large number of micromirrors on the reflecting surface 26a, and the number of mirrors is the same as that of the pixels. The light beams from the light-source lamp 201 are reflected to the direction of the projection lens unit 6 by the reflecting surface 26a.

The reflective display device 26 has the radiating surface on the rear surface thereof. The reflective display device 26 is cooled by transferring the heat of the radiating surface to the radiating unit 40, and by exchanging the heat with the air flowing in the intake duct 34 through the radiating fins 401 of the radiating unit 40.

(6) Structure of Lamp Unit

Figure 8:
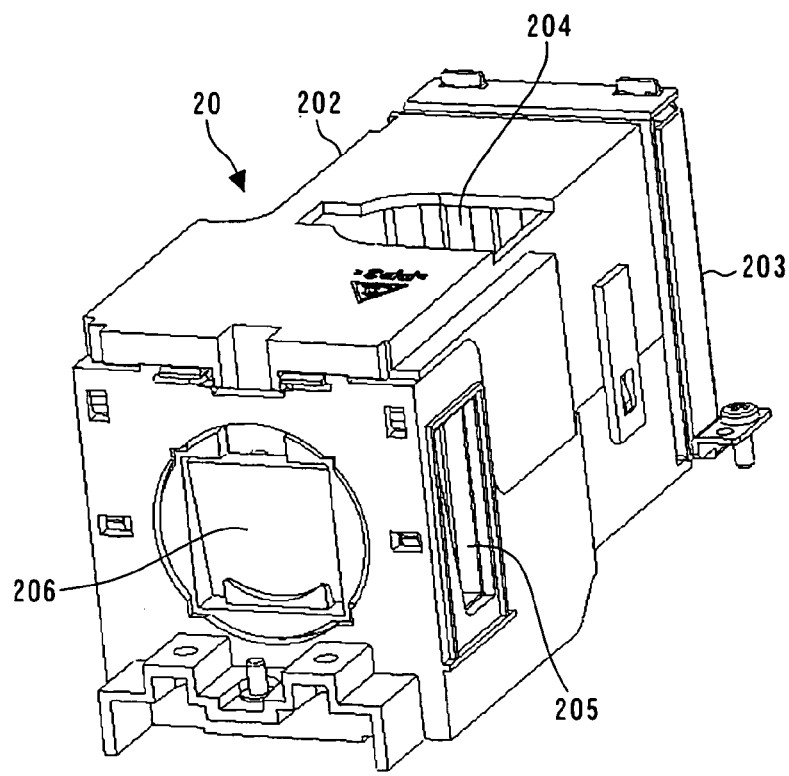
FIG. 8 is a perspective view of a lamp unit shown from above.
Figure 9:
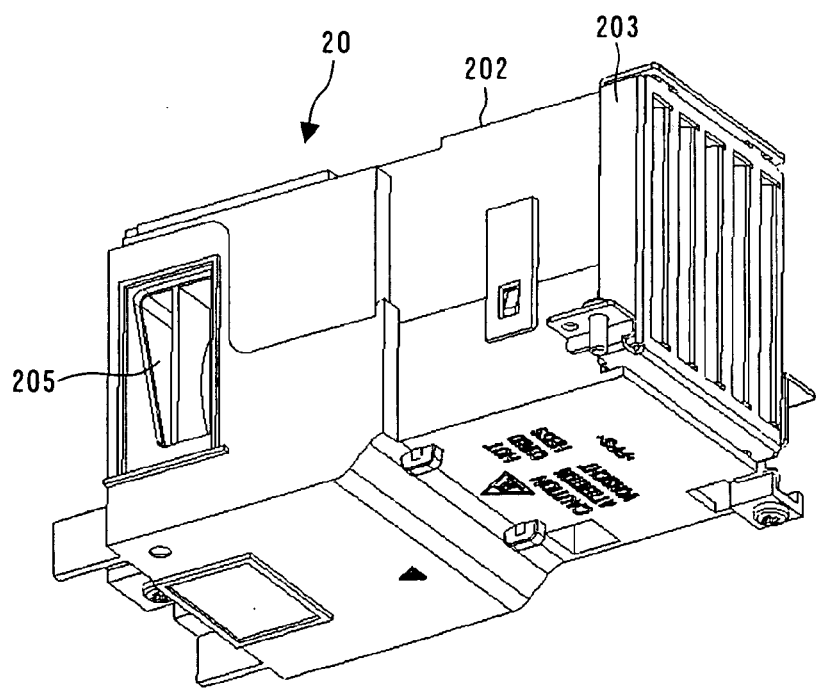
FIG. 9 is a perspective view of the lamp unit shown from below.

FIGS. 8 and 9 are external views of the lamp unit 20. FIG. 8 is a perspective view of the lamp unit 20 shown from above, and FIG. 9 is a perspective view shown from below.

As shown in FIG. 8, the lamp unit 20 is substantially a rectangular parallelepiped, and in the installed state, is hermetically sealed except for the air intake 205 into which air flows and openings of the metallic lattice 203 from which the air is discharged.

In the installed state, the opening 204 for the temperature sensor provided at the top of the housing 202 is hermetically sealed since a temperature sensor is fitted to the opening 204.

Furthermore, in FIG. 8, a glass plate is attached to the optical opening 206 at the front so as to ensure the hermetic state of this portion.

Since the housing 202 is hermetically sealed except for the inlet and the outlet of the cooling air as described above, the air volume is not reduced and the light-source lamp 201 can be efficiently cooled.

As shown in FIG. 9, the metallic lattice 203 is fixed to an air-exhausting plane of the housing 202 so as to be integrated with the housing 202.

Since the temperature of the light-source lamp 201 embedded in the housing 202 becomes considerably high under energized conditions, the temperature of the discharged air is also increased. The metallic lattice 203 has an effect in cooling the air discharged from the housing 202.

Figure 10:
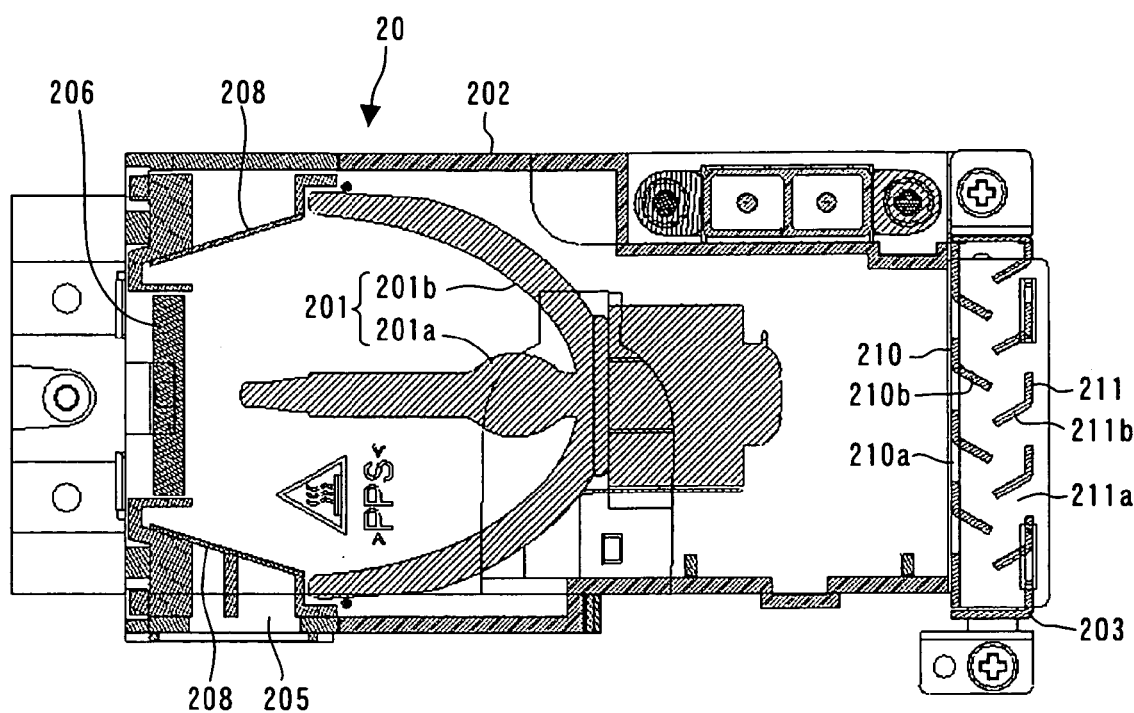
FIG. 10 is a horizontal cross-sectional view of the lamp unit.

FIG. 10 is a horizontal cross-sectional view of the lamp unit 20.

The housing 202 of the lamp unit 20 accommodates the light-source lamp 201. The light-source lamp 201 includes a light-source tube 201a disposed in the center and emitting light beams, and a paraboloidal reflector 201b collecting the light beams from the light-source tube 201a.

The heat generated at the light-source tube 201a is transferred to the reflector 201b. In this lamp unit 20, cooling air is blown on the reflector 201b in addition to the light-source tube 201a so as to improve the cooling efficiency.

A meshed protective net 208 is provided at the end of the circular opening of the reflector 201b along the circumferential direction so as to cover the opening. The protective net 208 prevents fragments from scattering to the exterior of the light-source lamp 201 even if the light-source tube 201a blows out.

The protective net 208 is meshed so as to pass cooling air. The air flowing into the housing 202 through the air intake 205 passes through the protective net 208, and forms a stream along the inner surface of the reflector 201b so as to cool the reflector 201b from the inner surface. The air that cooled the reflector 201b from the inner surface passes through the protective net 208, and flows to the rear surface of the reflector 201b so as to cool the reflector 201b also from the rear surface.

The metallic lattice 203 is integrated with the housing 202 at the end adjacent to the air outlets. As shown in FIG. 10, the metallic lattice 203 has a two-tier structure including a first lattice plate 210 and a second lattice plate 211.

The first and second lattice plates 210 and 211 include a large number of slits 210a and 211a and a large number of cooling fins 210b and 211b, respectively. The cooling fins 210b and 211b are inclined at predetermined angles with respect to the flowing direction of the cooling air (left to right in FIG. 10). Moreover, the angles of the cooling fins 210b of the first lattice plate 210 and the cooling fins 211b of the second lattice plate 211 are different. With this structure of the metallic lattice 203 shown in FIG. 10, the air passing through the metallic lattice 203 is efficiently cooled by the cooling fins 210b and 211b, and also, the strong light beams from the light-source lamp 201 can be prevented from leaking to the exterior of the housing 202.

As a result, annoying heat or light can be prevented from reaching an audience or the like adjacent to the projection-type image display apparatus 1.

(7) Flow of Cooling Air Flowing in the Second Flow Channel 51

Figure 11:
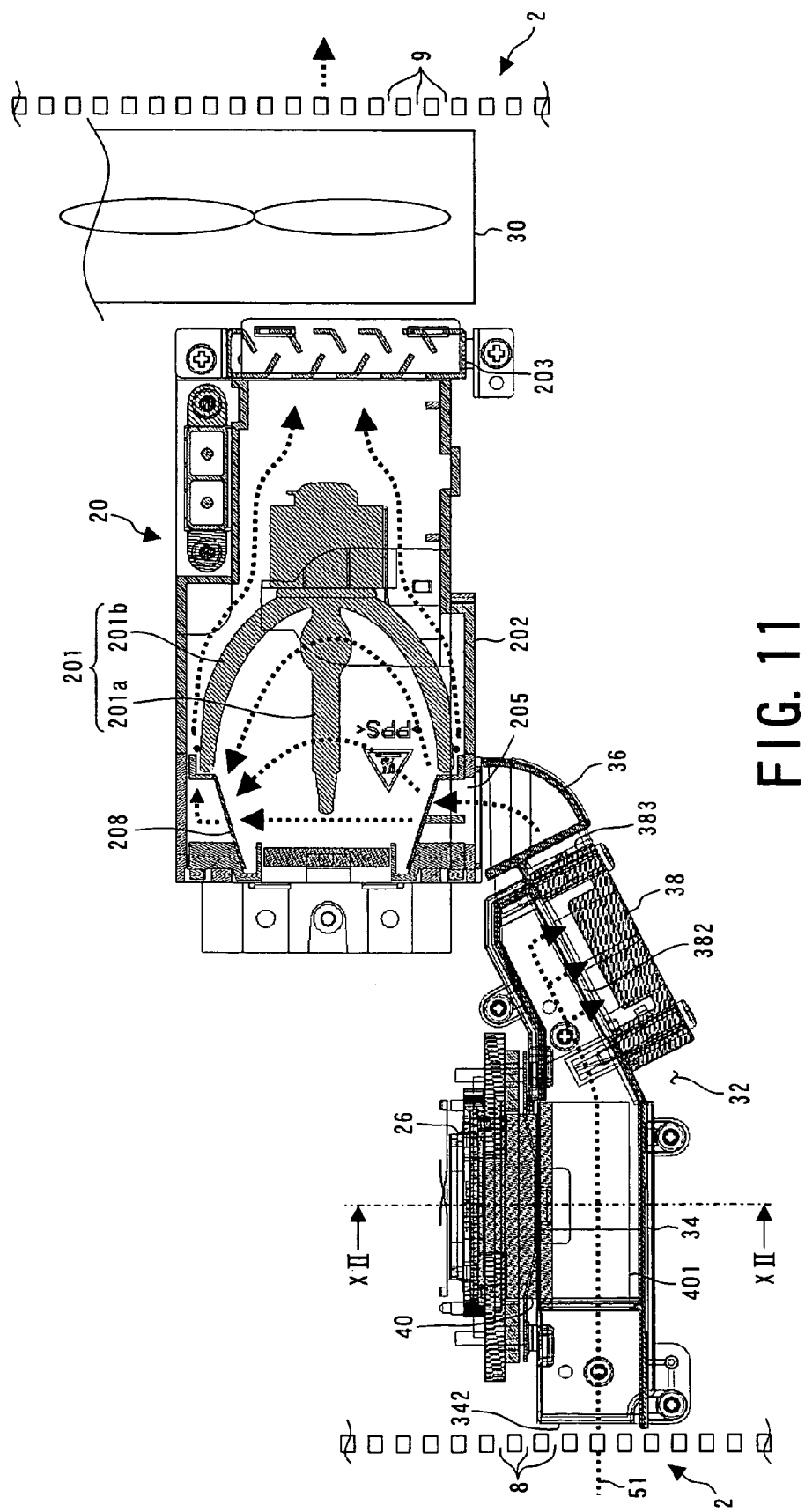
FIG. 11 illustrates the flow of the cooling air flowing in the second flow channel.

FIG. 11 illustrates the flow of the cooling air flowing in the second flow channel 51.

The second flow channel 51 includes two fans, the intake fan 38 and the exhaust fan 30, so as to forcedly draw and discharge air. Outside air is drawn from the air inlets 8 provided at the left side surface of the body casing 2 and discharged from the air outlets 9 provided at the right side surface of the body casing 2 by these two fans.

While the air drawn from the air inlets 8 to the intake opening 342 of the intake duct 34 flows toward the intake fan 38 through the intake duct 34, the air cools the radiating fins 401 of the radiating unit 40 accommodated in the intake duct 34. The radiating fins 401 occupy most of the space inside the intake duct 34 such that the heat-exchange area of the fins is increased.

The air that cooled the radiating fins 401 is drawn from the inlet 382 of the intake fan 38, pressurized in the intake fan 38, and then discharged from the outlet 383 of the intake fan 38 to the exhaust duct 36.

Figure 12:
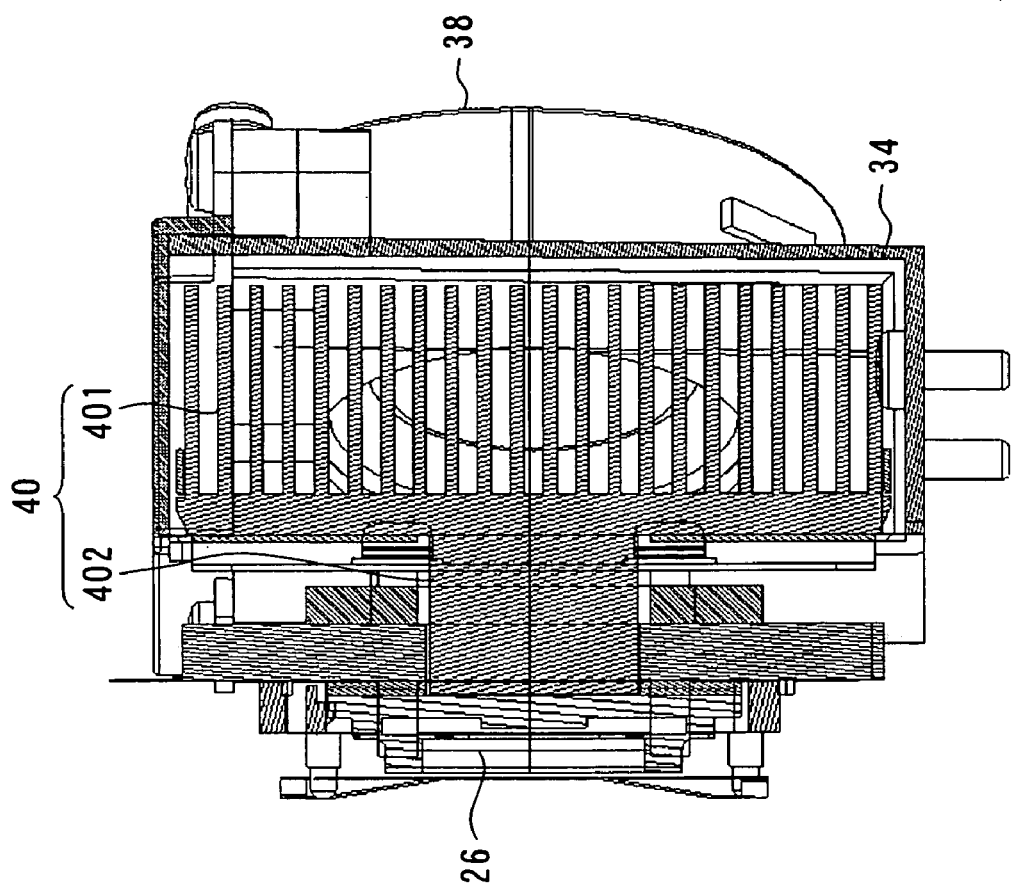
FIG. 12 is a cross-sectional view of the duct unit when the radiating unit is installed.

FIG. 12 is a cross-sectional view taken along line XII-XII in FIG. 11. As shown in FIG. 12, the large number of radiating fins 401 of the radiating unit 40 are accommodated in the intake duct 34 so as to occupy most of the space inside the intake duct 34. With this structure, the heat-exchange area can be increased, and almost all of the cooling air flowing in the intake duct 34 can be brought into contact with the surfaces of the radiating fins 401. Thus, the radiating fins 401 can be efficiently cooled.

As a result, the radiating surface of the reflective display device 26 thermally connected to the base 402 of the radiating unit 40 can be efficiently cooled.

The direction of the air discharged from the intake fan 38 is changed by the exhaust duct 36 as shown in FIG. 11, and the air flows into the housing 202.

The air flowing into the housing 202 flows along the inner surface of the reflector 201b of the light-source lamp 201, and cools the reflector 201b. Since the heat of the light-source tube 201a is transferred to the reflector 201b, the cooling of the reflector 201b leads to the cooling of the light-source tube 201a.

Moreover, the air flowing into the housing 202 cools the light-source tube 201a by directly contacting the light-source tube 201a.

The air flowing along the inside of the reflector 201b passes through the meshed protective net 208, and then flows through a space between the end of the circular opening of the reflector 201b and the housing 202 to the rear surface of the reflector 201b so as to cool the reflector 201b also from the rear surface.

In this manner, the air flowing inside the housing 202 directly comes into contact with the light-source tube 201a, and in addition, cools the reflector 201b by flowing along the inner surface and the rear surface of the reflector 201b. Thus, the light-source tube 201a, which is a heating element, can be efficiently cooled.

The air that cooled the light-source lamp 201 passes through the metallic lattice 203, is pressurized by the exhaust fan 30, and is then discharged from the air outlets 9 provided at the right side surface of the body casing 2 to the exterior of the body casing 2.

According to this projection-type image display apparatus 1, the light-source lamp 201 and the reflective display device 26 that have the most need of cooling in the projection-type image display apparatus 1 can be forcedly and actively cooled by a dedicated cooling channel (the second flow channel 51) that draws and discharges air, resulting in high cooling efficiency.

Moreover, since the second flow channel 51 includes the sealed housing 202 as well as the sealed duct unit 32, the air drawn from the intake opening 342 of the intake duct 34 flows without leaking. Accordingly, the light-source lamp 201 and the reflective display device 26 can be efficiently and actively cooled.

Yet moreover, high static pressure can be generated in the second flow channel 51 since the intake fan 38 and the exhaust fan 30 are arranged in series. Accordingly, a sufficient volume of air (air flow rate per unit of time) can be ensured even though the pressure loss of the flow channel is high due to, for example, the lamp unit 20 with a complicated inner structure or the intake duct 34 with the densely arranged radiating fins 401. As a result, high cooling capacity can be ensured.

Furthermore, both the reflective display device 26 and the light-source lamp 201 can be efficiently cooled by arranging the radiating fins 401 thermally connected to the reflective display device 26 that generates relatively small amount of heat upstream of the second flow channel 51, and by arranging the light-source lamp 201 that generates relatively large amount of heat downstream of the second flow channel 51.

If the light-source lamp 201 is arranged upstream on the contrary, the temperature of the air that cooled the light-source lamp 201 is increased, and the capacity for cooling the reflective display device 26 is reduced compared with this embodiment.

In addition, since the intake fan 38 is disposed between the lamp unit 20 and the intake duct 34, the accelerated cooling air can be sent to the lamp unit 20 compared with a case where the intake fan 38 is disposed adjacent to the intake opening 342 of the intake duct 34, resulting in increased cooling efficiency.

Furthermore, since the intake fan 38 is disposed between the lamp unit 20 and the intake duct 34, less noise generated by the intake fan 38 leaks to the exterior of the body casing 2 compared with the case where the intake fan 38 is disposed adjacent to the intake opening of the intake duct 34. As a result, noise that annoys an audience or the like can be reduced.

(8) Second Embodiment

According to the first embodiment, the housing 202 is substantially sealed, and as a result, the cooling air passing through the second flow channel 51 can be used for cooling the light-source lamp 201 without any loss of the volume.

However, the temperature of the air after cooling the light-source lamp 201 is considerably increased, and the heat may annoy an audience or the like adjacent to the air outlets 9 of the body casing 2.

Figure 13:
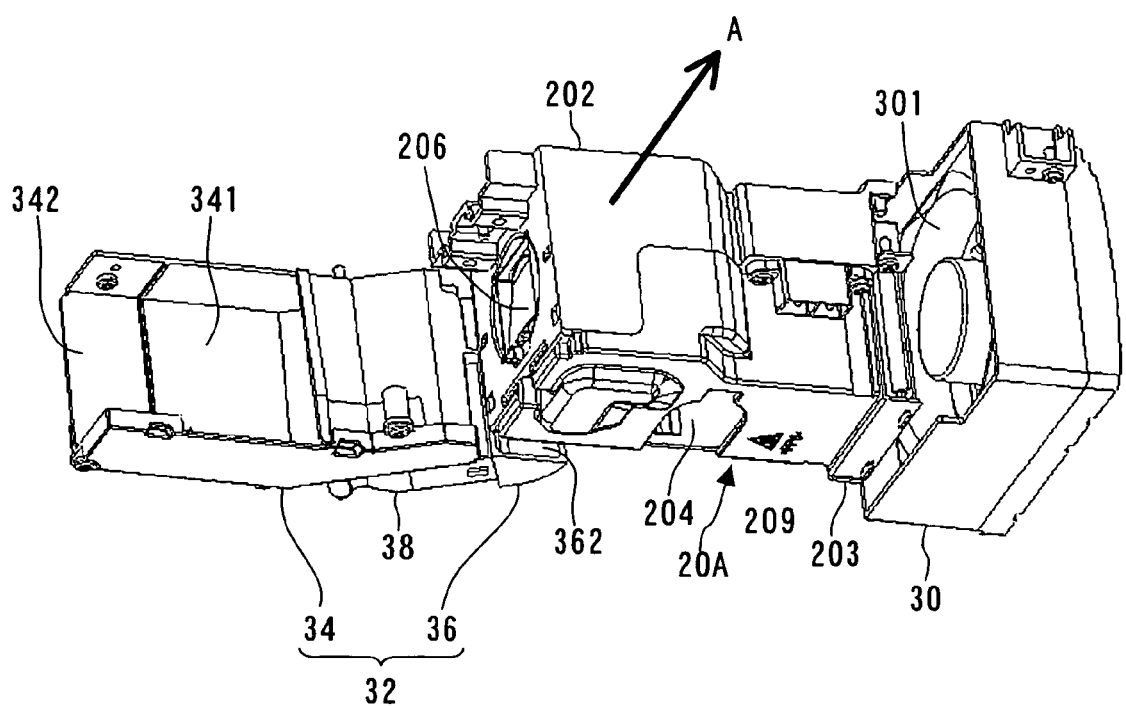
FIG. 13 illustrates an air intake vent and an air-escape hole in a projection-type image display apparatus according to a second embodiment of the present invention.

According to a second embodiment, an air intake vent 209 is formed at a side surface of a housing 202 of a lamp unit 20A as shown in FIG. 13.

The air inside a body casing 2 is drawn from the air intake vent 209 to the interior of the housing 202. Since the high-temperature air inside the housing 202 is mixed with the low-temperature air drawn from the interior of the body casing 2, the temperature of the air discharged from air outlets 9 is reduced so as not to annoy an audience or the like.

The position of the air intake vent 209 is not limited, and the air intake vent 209 may be formed in an appropriate position in four surfaces of six surfaces of the housing 202 except for a surface with an optical opening 206 and a surface with a metallic lattice 203.

Furthermore, as shown in FIG. 13, part of an exhaust opening 361 of an exhaust duct 36 may be exposed to the body casing 2 as an air-escape hole 362.

In this case, part of the air discharged from the intake fan 38 is leaked from the air-escape hole 362 to the interior of the body casing 2.

Since part of the air drawn from the exhaust duct 36 is leaked from the air-escape hole 362 to the body casing 2, the channel resistance, i.e. the pressure loss, of an entire second flow channel 51 is equivalently reduced.

As a result, the operating point at the volume of the air flowing in the exhaust duct 36 is shifted so as to increase the volume of the air compared with a case without the air-escape hole 362. Therefore, the capacity for cooling a reflective display device 26 thermally connected to radiating fins 401 accommodated in an intake duct 34 is increased.

On the other hand, since a constant volume of air is leaked from the air-escape hole 362 of the second flow channel 51 to the body casing 2, the volume of the air flowing into the housing 202 is reduced. As a result, the capacity for cooling a light-source lamp 201 is reduced compared with a case without the air-escape hole 362.

In this manner, ratios of the capacities for cooling the reflective display device 26 and the light-source lamp 201 can be changed by the air-escape hole 362.

Furthermore, the ratios of the capacities for cooling the reflective display device 26 and the light-source lamp 201 can be optimized by appropriately adjusting the opening area of the air-escape hole 362.

What is claimed is:

1. A projection-type image display apparatus comprising:
   a body comprising an air inlet and an air outlet and accommodating a heating element;
   a lamp unit comprising a light-source lamp and a housing that accommodates the light-source lamp and that comprises an air intake and an exhaust opening, the exhaust opening communicating with the air outlet;
   a duct unit comprising a first end adjacent to the air inlet, a second end adjacent to the air intake, and a flow channel connecting the first end and the second end;
   a radiating unit thermally connected to the heating element, at least part of the radiating unit being disposed inside the flow channel of the duct unit; and
   a fan disposed between the radiating unit in the flow channel and the second end of the duct unit, the fan drawing air from the air inlet through the first end of the duct unit and sending the air to the air intake through the second end of the duct unit.

2. The projection-type image display apparatus according to claim 1, wherein
   the lamp unit comprises a lattice structure having a plurality of openings and a plurality of cooling fins in the housing adjacent to the exhaust opening.

3. The projection-type image display apparatus according to claim 1, wherein
   the lamp unit comprises a lattice structure having two-tiered lattice plates with a plurality of openings and a plurality of cooling fins in the housing adjacent to the exhaust opening; and
   the cooling fins are inclined at a predetermined angle to a discharging direction of the air.

4. The projection-type image display apparatus according to claim 1, wherein
   the light-source lamp accommodated in the lamp unit comprises a light-source tube emitting light beams and a substantially paraboloidal reflector reflecting the light beams emitted from the light-source tube; and
   a protective net is disposed adjacent to an opening of the reflector so as to cover the opening.

5. The projection-type image display apparatus according to claim 1, wherein
   the lamp unit has an opening for a temperature sensor that detects the inner temperature thereof at a side surface of the housing; and
   the opening is sealed when the temperature sensor is attached to the opening.

6. The projection-type image display apparatus according to claim 1, wherein
   the lamp unit has an air intake vent at a side surface of the housing.

7. The projection-type image display apparatus according to claim 1, wherein
   an exhaust fan is disposed between the air outlet of the body and the exhaust opening of the housing.

8. The projection-type image display apparatus according to claim 1, wherein
   an exhaust fan is disposed between the air outlet of the body and the exhaust opening of the housing; and part of an inlet of the exhaust fan communicates with the exhaust opening of the housing, and the other part of the inlet of the exhaust fan is open to the interior of the body.

9. The projection-type image display apparatus according to claim 1, wherein the fan draws air from a direction parallel to a rotating shaft, and discharges the air to a direction orthogonal to the rotating shaft.

10. The projection-type image display apparatus according to claim 1, wherein the fan is of a multiblade centrifugal type.

11. The projection-type image display apparatus according to claim 1, wherein the duct unit comprises an intake duct and an exhaust duct, the fan being disposed therebetween; and the exhaust duct hermetically connects an outlet of the fan and the air intake of the housing.

12. The projection-type image display apparatus according to claim 1, wherein the duct unit comprises an intake duct and an exhaust duct, the fan being disposed therebetween; and the exhaust duct connects an outlet of the fan and the air intake of the housing, and comprises an air-escape hole that releases part of the air discharged from the fan into the interior of the body.

13. The projection-type image display apparatus according to claim 1, wherein the duct unit comprises an intake duct and an exhaust duct, the fan being disposed therebetween; and the exhaust duct comprises a bend that changes the flowing direction of the air discharged from the fan to a direction orthogonal to the plane of the air intake of the housing.

14. The projection-type image display apparatus according to claim 1, wherein the duct unit comprises an intake duct and an exhaust duct, the fan being disposed therebetween; and part of the radiating unit is accommodated inside the intake duct.

15. The projection-type image display apparatus according to claim 1, wherein the radiating unit comprises a base thermally connected to the heating element and a plurality of tabular fins radiating the heat of the base, the base and the tabular fins being integrated together; and the plurality of tabular fins are accommodated in the duct unit.

16. The projection-type image display apparatus according to claim 15, wherein the plurality of tabular fins are accommodated in the duct unit so as to occupy almost all of the section perpendicular to the axial direction of the duct unit.

17. The projection-type image display apparatus according to claim 1, wherein the heating element is a reflective display device modulating the intensity of the light beams emitted from the lamp unit for each pixel when reflecting the light beams, and projecting the light beams onto a screen mounted on the outside through a projection lens accommodated in the body.

* * * * *